(12) United States Patent
Bandhole et al.

(10) Patent No.: US 9,430,207 B1
(45) Date of Patent: Aug. 30, 2016

(54) AUTOMATED CROSS-PLATFORM NATIVE MOBILE APPLICATION GENERATION WITH CLOUD DRIVEN USER INTERFACE AND WORKFLOW SYNTHESIS

(71) Applicant: MobileForce Software, Inc., Sunnyvale, CA (US)

(72) Inventors: Jagadish Bandhole, Saratoga, CA (US); Bill Blume, San Jose, CA (US); Sekaran Nanja, San Jose, CA (US); TK Lakshman, San Carlos, CA (US)

(73) Assignee: MobileForce Software, Inc., Sunnyvale, CA (US)

( * ) Notice: Subject to any disclaimer, the term of this patent is extended or adjusted under 35 U.S.C. 154(b) by 0 days.

(21) Appl. No.: 14/206,537

(22) Filed: Mar. 12, 2014

Related U.S. Application Data (60) Provisional application No. 61/780,655, filed on Mar. 13, 2013.

(51) Int. Cl.
  *G06F 9/44* (2006.01)
  *G06F 9/45* (2006.01)
  *G06F 9/445* (2006.01)
  *H04W 4/00* (2009.01)

(52) U.S. Cl.
  CPC . *G06F 8/60* (2013.01); *G06F 8/38* (2013.01); *H04W 4/001* (2013.01); *G06F 8/71* (2013.01)

(58) Field of Classification Search
  CPC ............. G06F 8/41; G06F 8/60; G06F 8/71; G06F 8/443; G06F 8/447; H04W 4/001
  USPC .................................................. 717/151, 178
  See application file for complete search history.

(56) References Cited

U.S. PATENT DOCUMENTS

| | | | |
|---|---|---|---|
| 8,910,115 B2* | 12/2014 | Reddy et al. | 717/106 |
| 2006/0129972 A1* | 6/2006 | Tyburski et al. | 717/106 |
| 2009/0313004 A1* | 12/2009 | Levi et al. | 703/28 |
| 2010/0318958 A1* | 12/2010 | Kuester et al. | 717/104 |
| 2011/0154305 A1* | 6/2011 | LeRoux et al. | 717/140 |
| 2011/0161912 A1* | 6/2011 | Eteminan et al. | 717/101 |
| 2011/0209128 A1* | 8/2011 | Nikara et al. | 717/140 |
| 2011/0258595 A1* | 10/2011 | Clevenger | 717/106 |
| 2012/0089733 A1* | 4/2012 | Luh et al. | 709/225 |

(Continued)

OTHER PUBLICATIONS

IBM et al., "A Method to Handle Fragmentation of Platform Interfaces for Mobile Applications," IPCOM000185355D, ip.com, Jul. 2009, 4 pages.

(Continued)

*Primary Examiner* — Ryan Coyer
(74) *Attorney, Agent, or Firm* — Carr & Ferrell LLP (57) ABSTRACT

A cloud-based web platform providing for creating and managing native smartphone and tablet software applications for devices of different platforms based on a unified mobile specification is disclosed. The platform comprises a mobile application builder for creating, maintaining and editing a mobile application specification. The platform further comprises a mobile application engine for automatic compiling native mobile applications based on the mobile application specification. The platform further comprises a mobile application manager for delivering or deploying the native mobile applications to selected client devices and managing a workflow of the one or more native mobile applications.

20 Claims, 9 Drawing Sheets

(56) References Cited

U.S. PATENT DOCUMENTS

2012/0144384 A1* 6/2012 Baek .............................. 717/173
2014/0372518 A1* 12/2014 Moore et al. ................. 709/203

OTHER PUBLICATIONS

Non-Final Office Action, Dec. 31, 2014, U.S. Appl. No. 14/199,517, filed Mar. 6, 2014.
Notice of Allowance, Aug. 24, 2015, U.S. Appl. No. 14/199,517, filed Mar. 6, 2014.
Supplemental Notice of Allowabiltiy, Sep. 10, 2015, U.S. Appl. No. 14/199,517, filed Mar. 6, 2014.
Non-Final Office Action, Jan. 29, 2015, U.S. Appl. No. 14/198,567, filed Mar. 5, 2014.
Notice of Allowance, Sep. 10, 2015, U.S. Appl. No. 14/198,567, filed Mar. 5, 2014.

* cited by examiner

*MobileForce Manager*

610

( Analytics ) ( Dashboard ) ( Content ) ( Notifications ) ( Trivia ) ( Settings )

700

| Type | Category | Content Type | Title | Security | Modified Date | Created Date | Published Date | Action |
|------|----------|--------------|-------|----------|---------------|--------------|----------------|--------|
| ∞ | Unified video | Video | Rollout | Public | 2013-03-04 | 2013-03-04 | 2013-01-30 | Edit Copy Delete Archive |
| ▯ | Unified Content | PDF | Text | Public | 2013-03-01 | 2013-03-02 | 2013-01-30 | Edit Copy Delete Archive |

AUTOMATED CROSS-PLATFORM NATIVE MOBILE APPLICATION GENERATION WITH CLOUD DRIVEN USER INTERFACE AND WORKFLOW SYNTHESIS

CROSS-REFERENCE TO RELATED APPLICATIONS

This application claims benefit of U.S. Provisional Patent Application Ser. No. 61/780,655, filed on Mar. 13, 2013, entitled "Automated Declarative Cross-Platform Native Mobile App Generation with Cloud Driven UI and Workflow Synthesis," which is incorporated herein by reference in its entirety for all purposes.

TECHNICAL FIELD

This disclosure relates generally to data processing and, more specifically, to creating and managing native smartphone and tablet software applications for devices of different platforms based on a unified mobile specification.

BACKGROUND

The approaches described in this section could be pursued but are not necessarily approaches that have been previously conceived or pursued. Therefore, unless otherwise indicated herein, the approaches described in this section are not prior art to the claims in this application and are not admitted to be prior art by inclusion in this section.

Currently, portable handheld devices such as smartphones, tablet computers, and other mobile devices are widely used all around the world. Many individuals have mobile devices and use them for a variety of purposes. These devices can enable both cellular and Wi-Fi® communication and provide the users with the ability to access content almost instantly. In particular, these devices run application software, also known as "mobile application", "mobile app", or simply "app", which provide users with the access to various functionalities of these devices or content stored on the devices or on a remote server.

Mobile applications have been traditionally utilized for general productivity and information such as e-mail, calendar, contacts, and weather information. However, public demand and the availability of developer tools drove rapid expansion of mobile applications into other categories such as mobile games, navigation and location-based services, banking, order-tracking, fitness related monitoring and tracking, ticket purchases, and so forth. Mobile applications are usually available through application distribution platforms, such as Apple App Store®, Google Play®, Windows Phone Store®, and Blackberry App World®, which are specific to corresponding mobile devices such as an iPhone®, Android® phone, Windows Phone®, and Blackberry®, respectively.

The diversity of these devices presents challenges to developers who want to develop content for as wide an audience as possible, because the mobile devices are of different operating system (OS) platforms and require mobile applications to be written in supported languages. In other words, software developers need to create separate hardware/OS platform specific mobile applications for each type of mobile device, although the applications should also look similar, and provide the same functionalities and the ability to access the same content. For example, one should use Objective C language to create a native mobile application for iOS® devices (e.g., iPhone), Java to create a native mobile application for Android® devices, and .NET® language for Windows® phones. This approach allows using device core functionalities, but a native mobile application created for one device is not portable across other OS platforms and would need to be rewritten for each major OS platform.

In light of the above and for other reasons, it can be very expensive for small and middle size enterprises to develop and maintain different mobile applications for every type of OS platform. Furthermore, it may be very difficult, especially for small and middle size enterprises, to develop and properly maintain various backend web services tied to their mobile applications, as well as manage content to be delivered to users of mobile applications.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present technology provides for a unified server-based cross-OS/HW platform, which enables enterprises to design, compile, and deploy native mobile applications for client devices of different platforms in an easy manner. More specifically, the platform enables its users to select, specify and configure, rather than code, components of mobile applications, such as content, screens, plug-ins, widgets, functionality, and workflow, through a single, unified mobile application specification. The platform can be configured to automatically generate many native mobile applications for many OS/HW combinations of mobile devices, based on the same single unified mobile application specification and assist enterprises to deploy the native mobile applications across client devices. Accordingly, the platform generates different native mobile applications for different client device platforms and there is no need for the enterprise to create these applications separately.

The present technology further enables implementing native mobile applications on client devices in such a way that they are able to read or address the mobile application specification and corresponding plug-in/widget backend components at a run time and provide corresponding graphical user interfaces (GUIs) and workflow at run time, which is unified for all mobile OS platforms.

Furthermore, the platform enables the enterprises to manage lifecycle, updates and upgrades, workflow, content, plug-ins, widgets, and various elements of mobile applications in an easy manner through a single console interface. The platform is also configured to track ongoing usage of native mobile applications, their lifecycle and other parameters and provide enterprise users with analytics data based on the tracked parameters.

According to one illustrative embodiment of the present disclosure, there is provided a method for creating and managing native mobile applications. The method is implemented by a computing device comprising one or more processors, one or more memories, and one or more communication interfaces. One example of the computing device includes a server, while another example includes a distributed computing approach involving multiple interconnected computing devices, such as servers, also known as "cloud computing." The method comprises enabling users to design a mobile application using at least one web-console user interface (UI) and create, maintain, and edit a mobile application specification of the mobile application. The method further comprises compiling or generating one or more native mobile applications based at least on the mobile application specification. The method further comprises delivering the one or more native mobile applications to selected client devices and managing a User Interface and workflow of the one or more native mobile applications.

In certain embodiments, the native mobile applications are independent from an operating system of the one or more client devices. In additional embodiments, the method further comprises enabling the enterprise users to select, specify and configure UI elements of the mobile application, enabling the enterprise users to integrate one or more plug-ins or widgets into the mobile specification, enabling the enterprise users to select, specify, and configure content of the mobile application, and enabling the enterprise users to select, specify and configure a lifecycle of the mobile application, enabling the enterprise users to manage a lifecycle of the mobile application. In yet more embodiments, the method may comprise the step of tracking usage of the one or more native mobile applications.

In further example embodiments, steps of method(s) described herein may be stored on a computer readable storage medium having a program embodied thereon, with the program executable by a processor in a computing device. In yet further exemplary embodiments, modules, systems, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

As outlined above, embodiments of the present disclosure provide for creating and managing native mobile applications for various types of client devices running different OSs and/or having different hardware components and functionalities. The term "client device," as used in the present disclosure, refers to a wide range of portable computing devices such as cellular telephones, smartphones, tablet computers, laptop computers, personal digital assistants (PDAs), music players, in-vehicle infotainment units, and so forth. Some examples of client devices include an iPhone®, Android® phone, Windows Phone®, and BlackBerry®. The term "native mobile application," as used herein, refers to a mobile application specifically designed and created for a particular OS or platform. In this regard, one mobile application specification may be associated with two or more native mobile applications (for example, one native mobile application for iPhone® and another native mobile application for Android® based phone). Those skilled in the art will appreciate that the term "mobile application" is a generic term for software application, while "native mobile application" is a term to illustrate that a particular mobile application has been made suitable for a certain type of client device.

The generation of native mobile applications for different client devices is based on a mobile application specification (i.e., a unified language that can be created by enterprise users, for example, through a web-driven unified cross-platform (hereinafter referred to as a "platform")). The platform enables its users to rapidly specify or configure, rather than code, mobile application specifications stipulating mobile application GUIs, screens, content, data, functionality, integration, communication with hardware components and web or cloud driven services, and so forth. In this regard, enterprise users do not need to program native mobile applications; instead, programmers specify or configure various elements of a mobile application, while the platform automatically generates native mobile applications based upon the user's selections and instructions. For example, enterprise users may select, specify and configure content, screen, GUIs, actionable buttons, links, plug-ins, widgets, workflow, lifecycle, and so forth. For these ends, the platform has a console(s) or GUI suitable for non-professional developers enabling them to easily construct mobile applications and corresponding mobile application specifications. The platform also employs an engine or synthesizer, which is configured to convert the mobile application specification into a code of one or more native mobile applications. The code can be then deployed across selected client devices directly or through mobile application stores such as such as Apple App Store®, Google Play®, Windows Phone Store®, and Blackberry App World®. Notably, all native mobile applications created based on a single mobile application specification provide substantially the same graphical interface and functionalities regardless of hardware or OS platform of the client devices.

In certain embodiments, the platform also enables automating the entire native mobile application lifecycle including packaging native mobile applications, their delivery, deployment, hosting, use, management, access-control, update, upgrade, and usage tracking and analytics. In certain embodiments, the platform also includes a management interface configured to track, manage, and analyze the usage of native mobile applications, plug-ins, and widgets used, the usage of backend resources or services, and so forth.

In certain embodiments, native mobile applications can seamlessly integrate public or proprietary plug-ins or widgets enabling rapid and secure access to different backend systems directly from the client devices. In this regard, a single native mobile application installed on a client device provides bi-directional access to different enterprise back-end resources or services, public resources or services, cloud-based or web resources or services, and so forth.

These and other embodiments of the present disclosure are now described with reference to the figures of drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures, systems and devices are shown in block diagram form in order to facilitate describing one or more embodiments.

Figure 1:
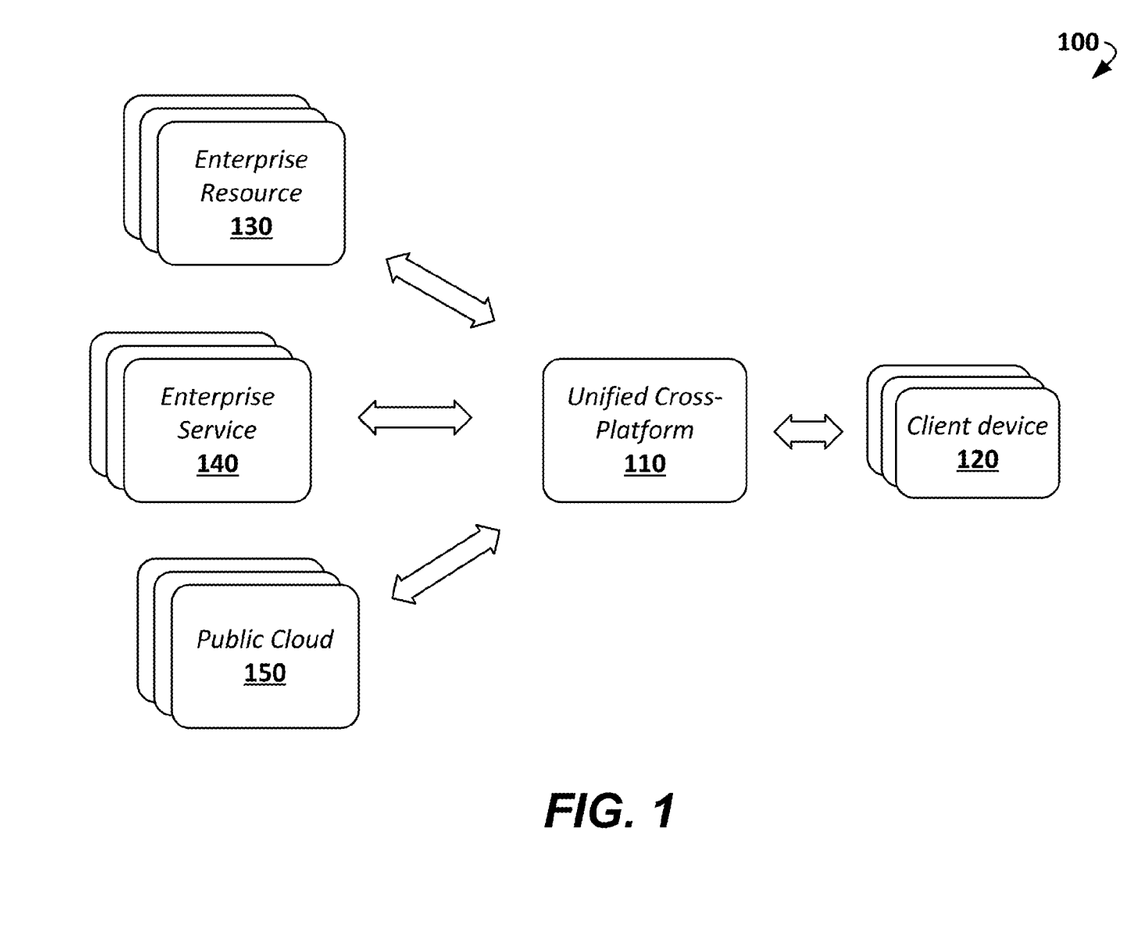
FIG. 1 shows a block diagram illustrating a system environment suitable for implementing methods for creating and managing native mobile applications.

FIG. 1 shows a high-level system environment 100 suitable for implementing methods for creating and managing native mobile applications, according to an example embodiment of the present disclosure. The environment 100 includes a unified cross-platform 110 (also referred to as a "platform"), which enables, inter alia, enterprise users to create and maintain mobile application specifications, generate native mobile applications based on the mobile application specification, deliver or deploy native mobile applications to client devices, and manage the workflow, lifecycle, usage, content, and other elements associated with the native mobile applications and the corresponding mobile application specification.

It is worth noticing that the platform 110 may be an integral part of a server, which may optionally provide cloud mobile services. In general, mobile cloud services are a discrete set of high-value middleware capabilities designed to be consumed by mobile applications. Mobile cloud services complement the platform and help accelerate and enrich mobile application development. The mobile cloud services may also provide platform-agnostic mobile application development and easy developing on-ramp via software development kits (SDKs).

In certain embodiments, the platform 110 is a standards compliant open platform including, for example, REST web-services, Application Programming Interfaces (APIs) enabling integration features, extensible plug-ins or widgets for rapid mobile application development, and a personalization engine for delivering specific content and native mobile applications to selected client devices 120 based on predetermined rules and criteria. Accordingly, the platform 110 communicates with one or more client devices 120 and a number of public and proprietary web resources and services 130-150 via one or more communication networks. As discussed above, the client devices 120 include, for example, smartphones or tablet computers, which are suitable for installing and running various native mobile applications such as native mobile applications synthesized by the platform 110.

In yet more embodiments, the platform 110 integrates one or more plug-in or widget components. These components may include software, middleware, applets, or any other virtual modules enabling implementation of dedicated customizable functionalities such as the addition of specific features to existing native mobile applications to enhance them with new operations, abilities, extensions and so forth. Plug-in components may include add-ons, snap-ins, themes, or other extensions needed for tailoring core features of native mobile applications. Widget components may include transient or auxiliary applications extending functionalities of native mobile applications, or providing new GUIs, screens, content, or new ways of interaction. The plug-in or widget components can be powered by resources or services provided by the elements 130-150.

Still referencing to FIG. 1, one or more enterprise resources 130 can bear specific content, data, or functionalities. In certain embodiments, the enterprise resources include an enterprise website, hosted domain, and public or proprietary information.

The term "enterprise" is used herein to the designate that the web services and content to be delivered to the client devices 120 is private and may possess commercial purposes. Similarly, the platform 110 may also communicate with one or more enterprise services 140 such as web services including REST-compliant web services enabling manipulation of XML (Extensible Markup Language) representations to the client devices 120 or arbitrary web services exposing arbitrary operations or processes. The platform 110 may also communicate with one or more public clouds 150 implementing a "cloud computing" model for online services or resources, such as public storage of content or software applications, available to the general public.

Accordingly, the platform 110 enables data transmission and processing across multiple mobile applications using cloud computing technology in order to minimize the number of tools needed for mobile application developers or owners. The platform 110 enables its users to create, host, deliver, and personalize native mobile applications independent of the hardware or OS of target client devices 120, as well as support content transactions and monitoring of mobile application activities.

As outlined above, the platform 110 enables enterprise users to create mobile application specifications. For these ends, there is no need for the users to write mobile application specifications using a programming language. Instead, the enterprise users may use a graphical console of the platform 110 having multiple UIs to design and specify various elements of the mobile application, which can be further synthesized "on-the-fly" into selected native mobile applications and delivered to the client devices 120. One of the features of the platform 110 and its graphical console is that the enterprise users can select plug-ins or widgets and integrate them into native mobile applications. The integration may be as simple as the integration of corresponding plug-in specifications or components and/or widget specifications or components into the mobile application specification.

Thus, the platform 110 enables the enterprise users to create customized and branded native mobile applications quickly, because the platform 110 provides a compositional, zero-programming approach to creating the mobile application specification. For example, there may be provided drag-and-drop elements, customizable buttons, graphical or screen elements, and other features, which can be used by non-professional developers in the creation of mobile application specifications. The platform 110 may also employ built-in templates that non-programmers may intuitively use to build native mobile applications. Professional programmers may take advantage of this approach to start building native mobile applications and seamlessly extend their functionalities by simply adding their custom coded components through the platform's plug-in or widget architecture.

Figure 2:
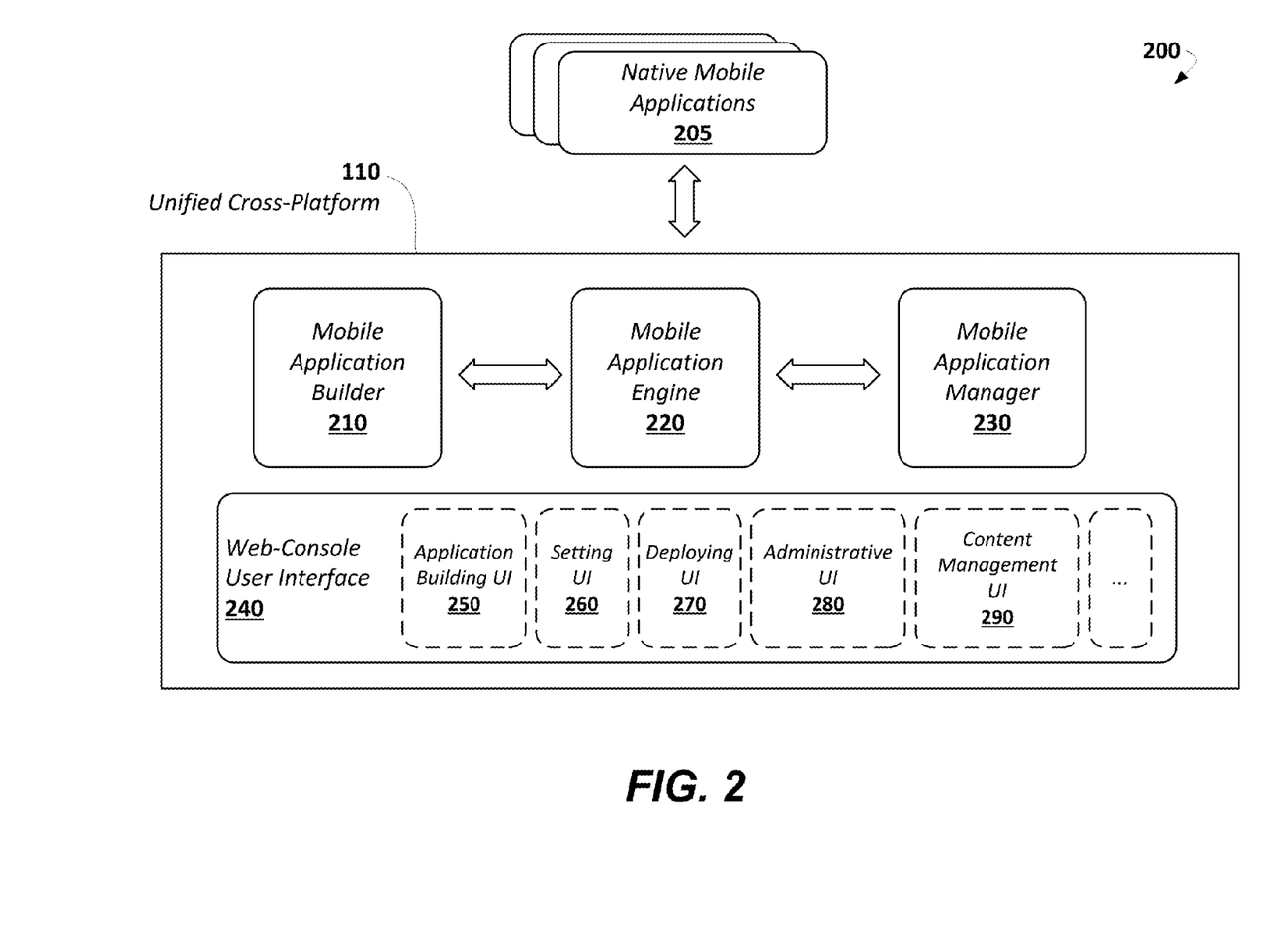
FIG. 2 shows a block diagram illustrating an example virtual environment suitable for implementing methods for creating and managing native mobile applications, and further showing components of a unified cross-platform.

FIG. 2 is a high-level block diagram illustrating an example virtual environment 200 suitable for implementing the methods for creating and managing native mobile applications, according to one embodiment of the present disclosure. As shown in the figure, the platform 110 includes four major components: a mobile application builder 210, mobile application engine 220, mobile application manager 230, and a web-console UI 240.

The mobile application builder 210 is a virtual module that is configured to enable enterprise users to design a mobile application and accordingly create, maintain, and edit a mobile application specification. For these ends, the enterprise users utilize an application building UI 250 and a setting UI 260 provided by the web-console UI 240. More specifically, the application building UI 250 and the setting UI 260 can be used by enterprise users to: select, specify and configure UI elements of the mobile application (e.g., buttons, screens, etc.), select, specify and configure one or more plug-ins or widgets, select, specify and configure functionality and operation of the mobile application, select, specify and configure content of the mobile application, select, specify and configure a workflow of the mobile application, select specify and configure a lifecycle of the mobile application, select, specify and configure authentication mechanisms of the mobile application, select, specify and configure authorization mechanisms of the mobile application, select, specify and configure integration of the mobile application with backend or cloud driven services, select, specify and configure integration of the mobile application with backend or cloud driven resources, select, specify and configure changes and updates to the mobile application on an ongoing basis, by just changing the application specification through the platform, then publishing the changes, and so the next time any mobile app that uses this application specification, launches it is given a choice to "upgrade/update" to the latest published application specification, thus eliminating expensive and time consuming dev/build/test cycles and so forth.

Once the mobile application specification is designed and created, the mobile application engine 220 may, upon request of a particular user, automatically compile or generate a predetermined number of native mobile applications 205.

Further, the native mobile applications 205 may be delivered to client devices 120 or mobile application stores with the help of the mobile application manager 230. In other embodiments, the native mobile applications 205 may be deployed directly to the client devices 120. In either case, the delivery or deployment may be triggered by enterprise users using a deploying UI 270.

The mobile application manager 230 is also configured to track and manage a workflow of the native mobile applications 205. In certain additional embodiments, the mobile application manager 230 is also configured to track and manage a lifecycle of the native mobile applications 205. Furthermore, in some embodiments, the mobile application manager 230 is also configured to track and analyze the usage of native mobile applications, aggregate various parameters and characteristics associated thereto (e.g., determine a number of users, type of devices used, when and how the native mobile application is used, demographics, statistical data, usage patterns, etc.). The aggregated data can then be displayed to the enterprise users upon request. In yet more embodiments, the mobile application manager 230 is also configured to update the native mobile applications 205 based on amendments made to the mobile application specification.

Still referencing FIG. 2, the enterprise users may use a content management UI 290 to upload, download, manage, or edit various content elements. The content elements include, but are not limited to, texts, multimedia, still or moving images, audio, files, electronic documents, applets, add-ons, software, firmware, and middle-ware. The content management UI 290 is useful to manage multiple content elements used by the mobile application(s).

Figure 3:
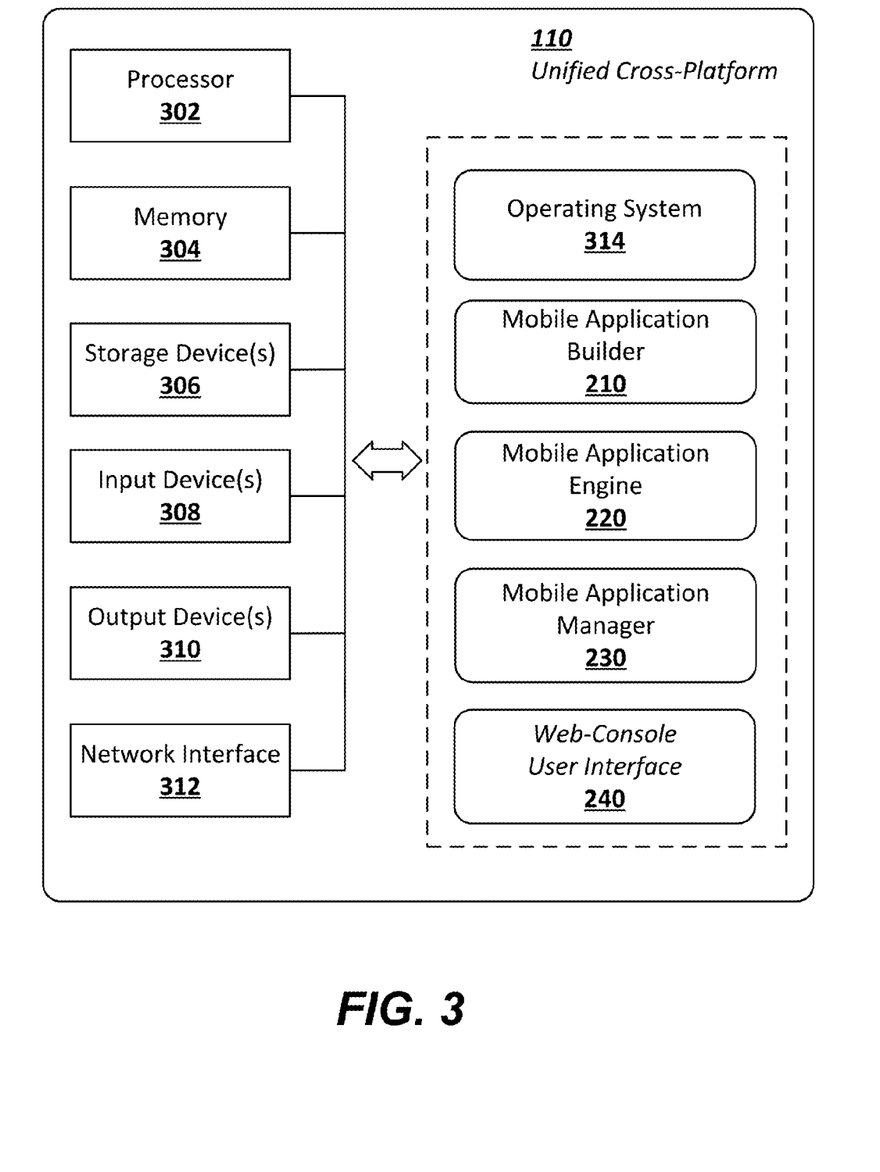
FIG. 3 shows a block diagram illustrating an example unified cross-platform.

FIG. 3 is a high-level block diagram illustrating an example platform 110 suitable for implementing the methods described herein. In particular, the platform 110 may be used for creating and managing mobile application specifications, rendering native mobile applications based on the mobile application specifications, sending or deploying the native mobile applications across multiple client devices 120 or mobile application stores, monitoring workflow, lifecycle, and usage of the native mobile applications, and so forth.

In general, the platform 110 may include, be, or be an integral part of, one or more of a variety of types of devices and systems such as a general-purpose computer, desktop computer, server, computer network, network service, cloud computing service, and so forth. In some embodiments, the platform 110 has cloud-based implementation meaning it integrates multiple web servers and their services.

As shown in FIG. 3, the platform 110 includes one or more processors 302, a memory 304, one or more storage devices 306, one or more optional input devices 308, one or more optional output devices 310, and a network interface 312. One or more processors 302 are, in some examples, configured to implement functionality and/or process instructions for execution within the platform 110. For example, the processors 302 may process instructions stored in memory 304 and/or instructions stored on storage devices 306. Such instructions may include components of an operating system 314. Platform 110 may also include one or more additional components not shown in FIG. 3, such as a housing, power supply, communication bus, and so forth.

Memory 304, according to one example, is configured to store information within the platform 110 during operation. Memory 304, in some example embodiments, may refer to a non-transitory computer-readable storage medium or a computer-readable storage device. In some examples, memory 304 is a temporary memory, meaning that a primary purpose of memory 304 may not be long-term storage. Memory 304 may also refer to a volatile memory, meaning that memory 304 does not maintain stored contents when memory 304 is not receiving power. Examples of volatile memories include random access memories (RAM), dynamic random access memories (DRAM), static random access memories (SRAM), and other forms of volatile memories known in the art. In some examples, memory 304 is used to store program instructions for execution by the processors 302. Memory 304, in one example, is used by software (e.g., the operating system 314), applications, or virtual modules 210-240, such as a software, firmware, or middleware for designing, generating, and maintaining native mobile applications, executing on platform 110 to temporarily store information during program execution. One or more storage devices 306 can also include one or more transitory or non-transitory computer-readable storage media and/or computer-readable storage devices. In some embodiments, storage devices 306 may be configured to store greater amounts of information than memory 304. Storage devices 306 may further be configured for long-term storage of information. In some examples, the storage devices 306 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 3, the platform 110 optionally includes one or more input devices 308. The input devices 308 are configured to receive input from users such as enterprise users. Examples of input devices 308 may include a keyboard, keypad, mouse, trackball, touchscreen, touchpad, or any other device capable of detecting an input from a user or other source, and relaying the input to platform 110, or components thereof. The optional output devices 310, in some examples, are configured to provide output to users through visual or auditory channels. Output devices 310 include a video graphics adapter card, liquid crystal display (LCD) monitor, light emitting diode (LED) monitor, sound card, a speaker, or any other device capable of generating output that may be intelligible to a user.

The platform 110, in some example embodiments, includes network interface 312. The network interface 312 can be utilized to communicate with external devices via one or more networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth radio, and an IEEE 802.11-based radio frequency network, among others. The network interface 312 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB.

The operating system 314 may control one or more functionalities of platform 110 and/or components thereof. For example, the operating system 314 may interact with the applications or modules 210-240, and may facilitate one or more interactions between modules 210-240 and one or more of processors 302, memory 304, storage devices 306, input devices 308, and output devices 310. As shown in FIG. 3, the operating system 316 may interact with or be otherwise coupled to the modules 210-240 and components thereof. In some embodiments, modules 210-240 may be included in operating system 314.

Still referencing to FIG. 3, the software implemented modules 210-240 include the mobile application builder 210, mobile application engine 220, mobile application manager 230, and web-console UI 240. The mobile application builder 210 enables enterprise users to create mobile application specifications in an easy manner by selecting, specifying and configuring all required components of the mobile application. In some embodiments, the enterprise users use drag-and-drop functionality to specify mobile application elements, content, controls, rules, and interaction therebetween and with other web resources or services. The enterprise users may specify or configure mobile application presentation, workflow, lifecycle, and integration.

The mobile application engine 220 enables users to automatically compile or construct native mobile applications based on mobile application specifications created with the help of mobile application builder 210. The mobile application engine 220 creates multiple native mobile applications for a variety of devices or OS platforms based on a single mobile application specification. The mobile application engine 220 may also facilitate sending the native mobile applications to selected client devices 120, as well at the installation and deployment of the applications.

The mobile application manager 230 provides a great number of tools and mechanisms to control, amend, and update native mobile applications, their deployment, and usage; control content; implement reporting; and so forth. In some embodiments, the mobile application manager 230 enables users to manage a workflow and lifecycle of multiple native mobile applications, track and monitor usage of multiple native mobile applications, manage mobile application specifications distributed over multiple servers, and so forth. These elements are described above, with reference to FIG. 2, in greater details.

FIGS. 4-7 illustrate schematic diagrams of various exemplary GUIs displayable by a computing device to enterprise users at different steps of creating, deploying, and managing native mobile applications. The computing device used to show these GUIs may refer to a desktop or laptop computer which is operatively connected, for example, via a network to the platform 110. The GUIs shown in these drawings can be generated with the help of the web-console user interface 240. In particular, the GUIs shown in FIGS. 4-7 may be associated with one or more of the UIs 250-290.

Figure 4:
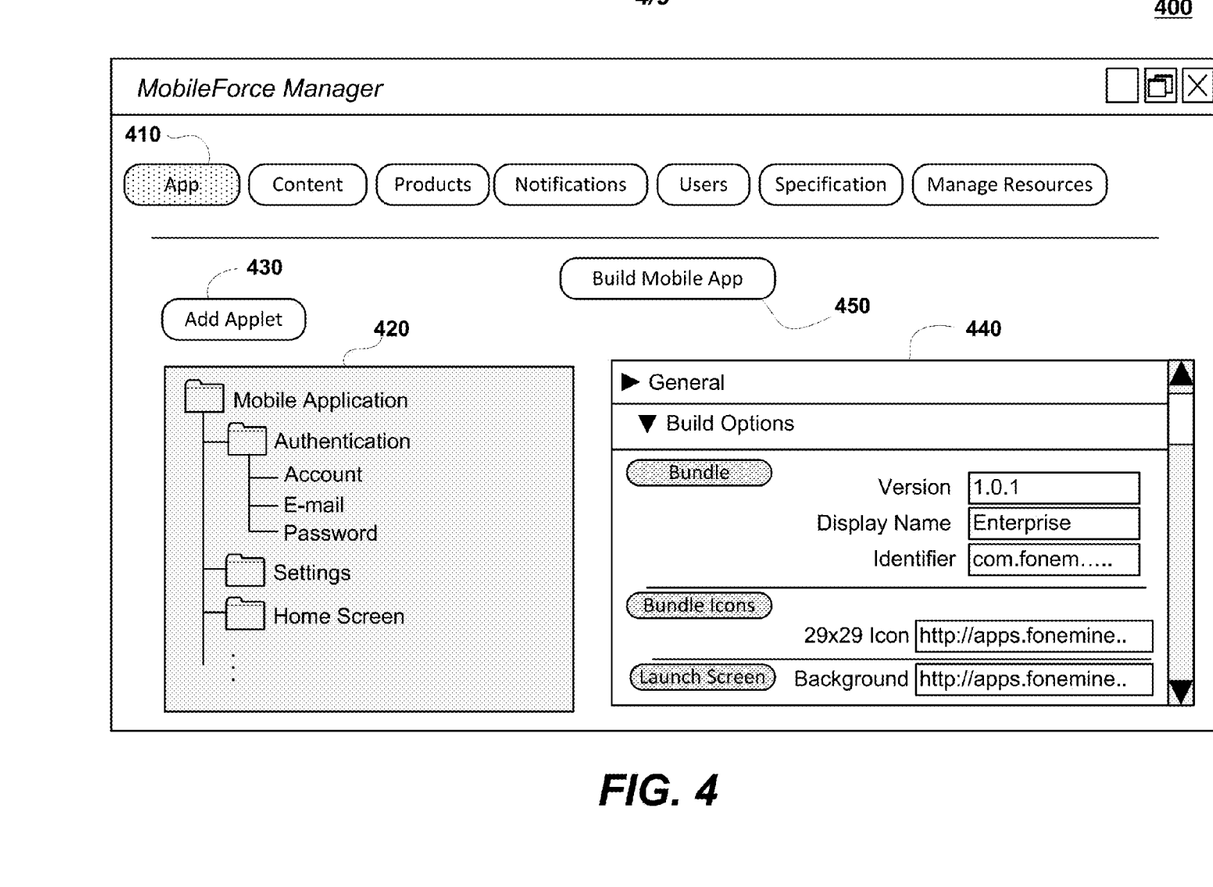
FIG. 4 shows an example GUI associated with a unified cross-platform for creating and managing mobile application specifications and corresponding mobile applications.

FIG. 4 shows an exemplary GUI 400 associated with the platform 110 suitable for creating and managing mobile application specifications and corresponding mobile applications. The GUI 400 is one example of the application building UI 250. The GUI 400 includes a plurality of tab buttons including, but not limited to, "App" button 410, "Content" button, "Products" button, "Notifications" button, "Users" button, "Specification" button, and "Manage Resources" button. When "App" button 410 is activated by an enterprise user, he may start creating or editing a mobile application and corresponding mobile application specification. The "Content" button will lead the enterprise user to a page for content managing such as GUI 700 shown in FIG. 7. When the "Products" button is activated by the enterprise user, he may integrate plug-ins or widgets. Similarly, the "Notifications" button leads to a page for managing notifications and alerts. The "Users" button leads to a page for managing users of the mobile application and the "Specification" button will lead to a page for reviewing the mobile application specification.

Still referencing to FIG. 4, the GUI 400 includes a mobile application element structure 420 and a setting widget 440. The mobile application element structure 420 is a structure of applets and mobile application screens (pages), elements, files, functions, settings, and other elements, all constituting a mobile application specification. For example, by selecting the "Authentication" section, the enterprise user is able to set parameters for the way in which client device users shall be authenticated or authorized before using the mobile application. In this regard, the enterprise users may specify that the client device users need to provide an account name, email, and a password. Similarly, every single graphical, audio, or functional element of the mobile application can be set and specified. The enterprise users may create, edit, or delete the mobile application element structure 420 at any time. For example, the enterprise user may add an additional element or additional applet by clicking the "Add Applet" button 430.

The setting widget 440 enables the enterprise users to provide additional information, settings, links, rules, and so forth. For example, the enterprise user may provide hyperlinks to web resources storing graphical elements such as icons, backgrounds, and so forth.

When the enterprise user clicks "Build Mobile App" button 450, the mobile application engine 220 generates native mobile applications based on the mobile application as designed using the mobile application element structure 420 and the setting widget 440. Once native mobile applications are created, they are stored or hosted, for example, on a cloud service for further delivery and deployment on target client devices 120.

Figure 5:
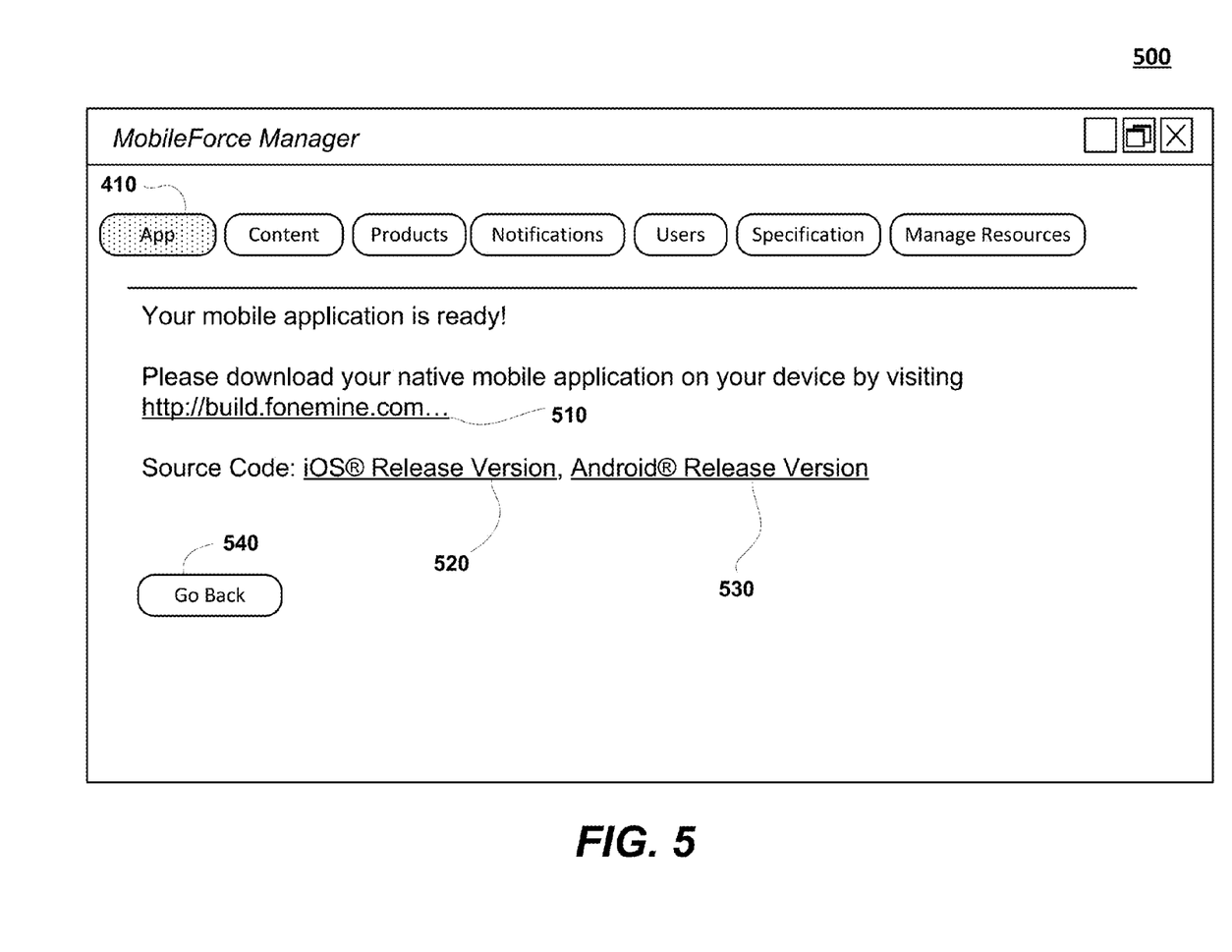
FIG. 5 shows an example GUI for delivering and deploying native mobile applications.

FIG. 5 shows an exemplary GUI 500 suitable for delivering and deploying native mobile applications. The GUI 500 is displayed after the enterprise user activated the "Build Mobile App" button 450. As shown in the figure, the GUI 500 provides a hyperlink 510 to a storage where the native mobile application(s) is(are) stored. There is also a hyperlink 520 to a storage of a source code for a first native mobile application suitable for iOS® devices, and a hyperlink 530 to another storage of a source code for a second native mobile application suitable for Android® based devices. If the user clicks the "Go back" button 540, the enterprise user is provided with the GUI 400.

Figure 6:
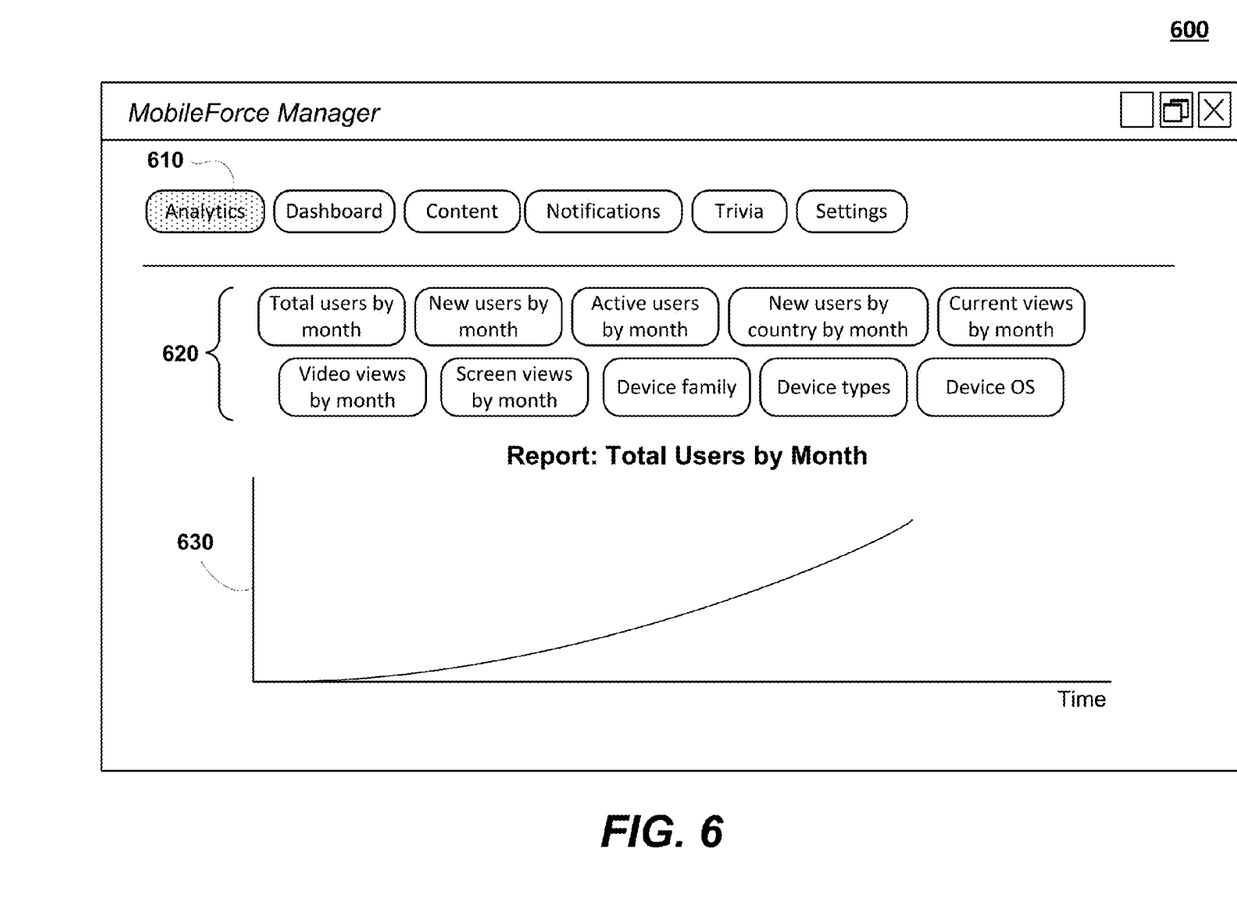
FIG. 6 shows an example GUI for presenting analytics and monitored data.

FIG. 6 shows an exemplary GUI 600 suitable for presenting analytics and monitored data. In particular, the GUI 600 may refer to an example of the administrative UI 280. There are a number of actionable buttons such as the "Analytics" button 610, as well as buttons 620 to show various statistical or analytical data including, but not limited to, a total number by month, a number of new users by month, a number of active users by month, a number of new users by country and month, a number of current views by month, and so forth. Accordingly, once the enterprise user selects, for example, "Total users by months," a graph 630 is presented showing a number of new users against time.

Figure 7:
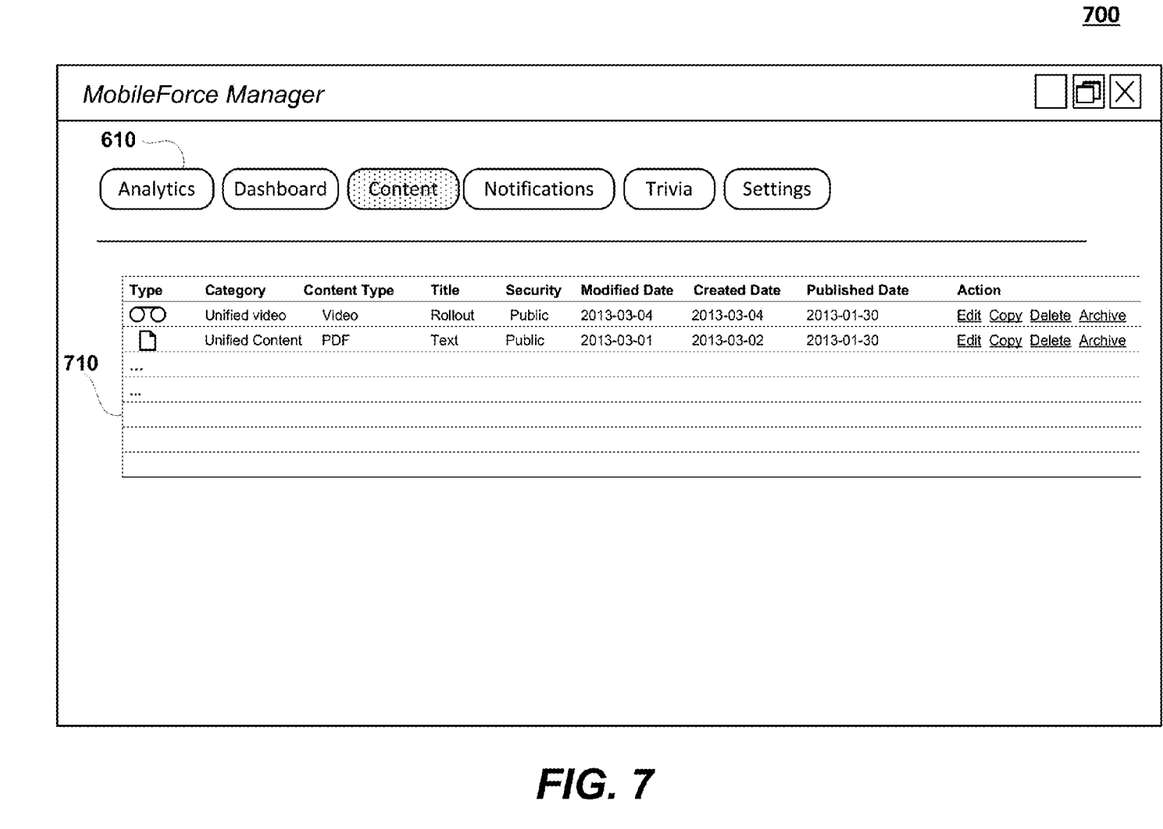
FIG. 7 shows an example GUI suitable for content management.

FIG. 7 shows an exemplary GUI 700 suitable for content management. The GUI 700 is one example of the content management UI 290. As shown in this figure, the GUI 700 includes a table 710 where each string refers to a particular content element such as a video file, an audio file, a text file, a PDF file, and so forth. The enterprise user may manage all these files by editing them, copying, deleting, archiving, downloading, uploading new, and so forth. The table 710 is a very suitable way to manage all content files and update them when needed in a single place.

Figure 8:
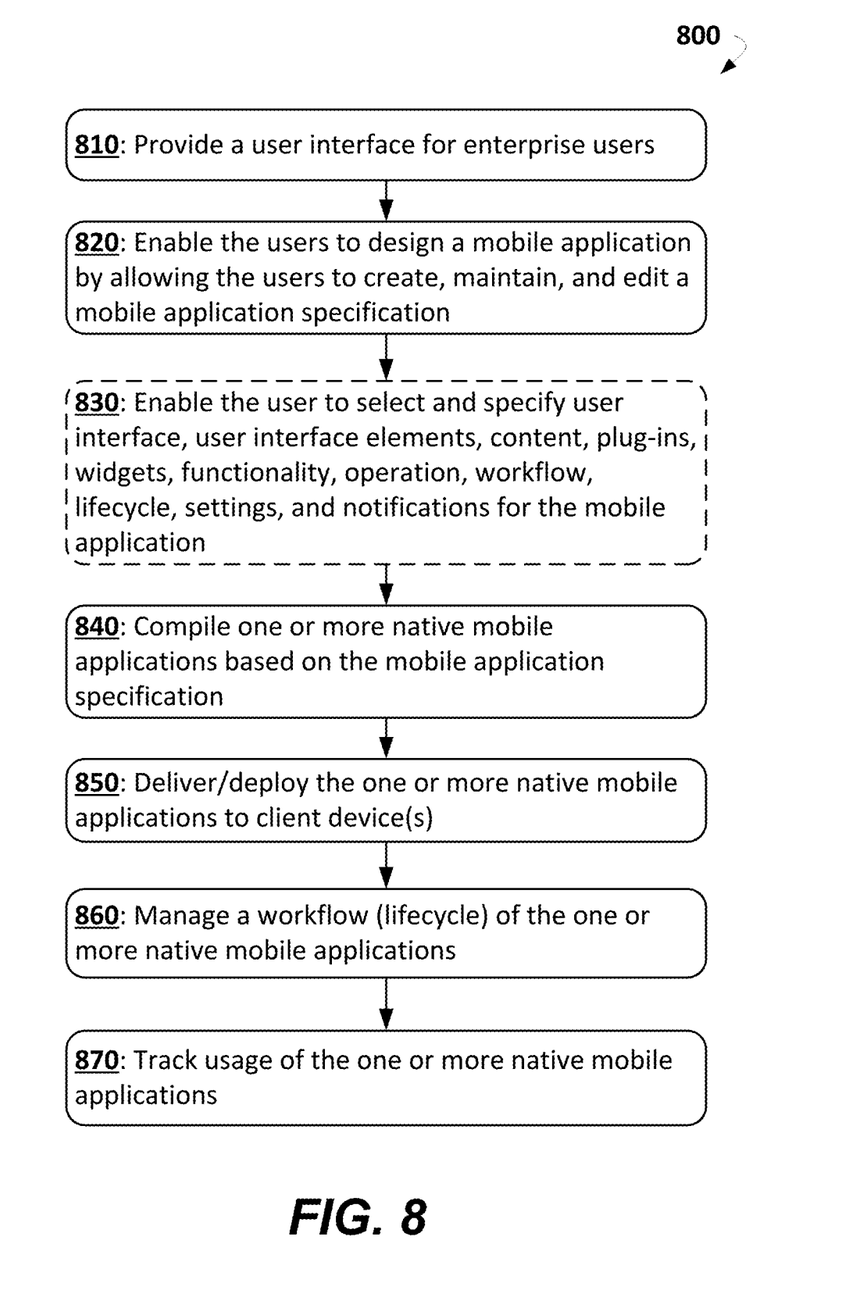
FIG. 8 shows a process flow diagram of an example method for creating and managing native mobile applications.

FIG. 8 shows a high-level process flow diagram of a method 800 for creating and managing mobile applications, according to one exemplary embodiment. The method 800 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 800 is implemented by the platform 110 shown in FIGS. 1-3; however, it should be appreciated that the method 800 is just one example operation of the platform 110. In addition, the below recited steps of the method 800 may be implemented in an order different than described and shown in FIG. 8. Moreover, the method 800 may have additional steps not shown herein, but which can be evident for those skilled in the art from the present disclosure. The method 800 may also have fewer steps than outlined below and shown in FIG. 8.

The method 800 commences at step 810 with the platform 110 providing an enterprise user with a UI such as the GUI 400. At step 820, the platform 110 enables the enterprise user to design a mobile application by allowing them to create, maintain, and edit a mobile application specification. At optional step 830, the platform 110 enables the enterprise user to select, specify and configure UIs, UI elements, content, plug-ins, widgets, as well as their functionality, operation, integration, rules, principles of interaction with other elements, workflow, lifecycle, settings, notifications, and the like. Accordingly, by selecting and specifying at least some of these elements, the platform 110 automatically builds or updates the corresponding mobile application specification.

At step 840, the platform 110 compiles one or more native mobile applications based upon the mobile application specification. The compiled native mobile applications may be stored locally, via a cloud driven service or mobile application stores. At step 850, the platform 110 delivers or deploys the native mobile applications to selected designations (e.g., to selected client devices 120). At step 860, the platform 110 automatically manages or enables the enterprise users to manage a workflow and/or lifecycle of the native mobile applications created at the step 840. Furthermore, at optional step 870, the platform 110 tracks the usage of the native mobile applications and aggregates statistical data for further analysis.

It is important to understand that a mobile application specification abstracts away native UI components from the native mobile application using "screen" and similar UI constructs, each of which is further filled with rules, instructions, and content to enable richness and control flow. Furthermore, in some embodiments, the mobile application specification enables the native mobile application to automatically render its native UI dynamically, upon startup, directly from this specification. In some embodiments, the mobile application specification also enables the native mobile applications to compose plug-ins and/or widgets and synthesize their native UI dynamically (for example, upon startup) directly based upon the mobile application specification.

As outlined above, the mobile application builder 210 provides UI elements for mobile applications such as "screens" and "screen" constructs (each of which is further nested to enable richness and control flow), mobile application building settings, UI icons and graphical elements, and application management settings. Each screen itself can also include UI elements such as lists, grid, tabs, and screens can be nested to support control flow.

The mobile application builder 210 also supports native viewers for content types such as RSS, audio, video, images, slides, and document types such as PDF, word, powerpoint, excel and others. The mobile application builder 210 also supports built-in widgets for questionnaires, visual catalogues, configurators, pricing quotes, locators, and many more. The mobile application builder 210 also provides integration plugin-driven native rendering for the following enterprise systems of record: SFA®, CRM, ERP, Jabber®, Box®, autoforms, content management systems (CMSs), dynamic lists, collaboration systems, and data tables. The mobile application manager 230, through corresponding UIs 280, 290, provides ongoing management, push notifications, tracking, usage, analytics, and control of enterprise content and services that the mobile application accesses.

The mobile application specification, as created using the present technology, also includes application content and application instruction elements. The application content may either be internal or external (i.e., retrieved from public cloud or other web resources). Application instruction elements may include tags, application applets, plug-ins, widgets, GUI elements, and so forth.

The applets represented in the mobile application specification may "modularize" different aspects of enterprise resources/services being integrated, solutions to be sold, or distinct workflow activities such as "product selling," "account management," "expense reporting," "visualization," and so forth. For example, a sales person may start unified collaboration to engage a customer, get customer info using SalesForce®, then do a product presentation from an enterprise CMS, followed by a Configure-Price-Quote (CPQ) from SAP® or Siebel® or other backend systems, and finally upload an order into an ordering system, all from a single enterprise mobile application.

As mentioned above, there are a number of "screen" and similar UI elements in the mobile application specification. These elements represent the initial UI to be shown to the users of client devices 120. In the example above, the "screen" elements specify a "grid" layout consisting of multiple actionable "buttons" each represented as a "screen" element. The "data" section, as shown in the example above, represents enterprise services such as "enterprise communities," "Knowledge bases," "CRM/SFA systems," for which the integration plug-ins and authentication credentials may reside on one or more cloud services.

Figure 9:
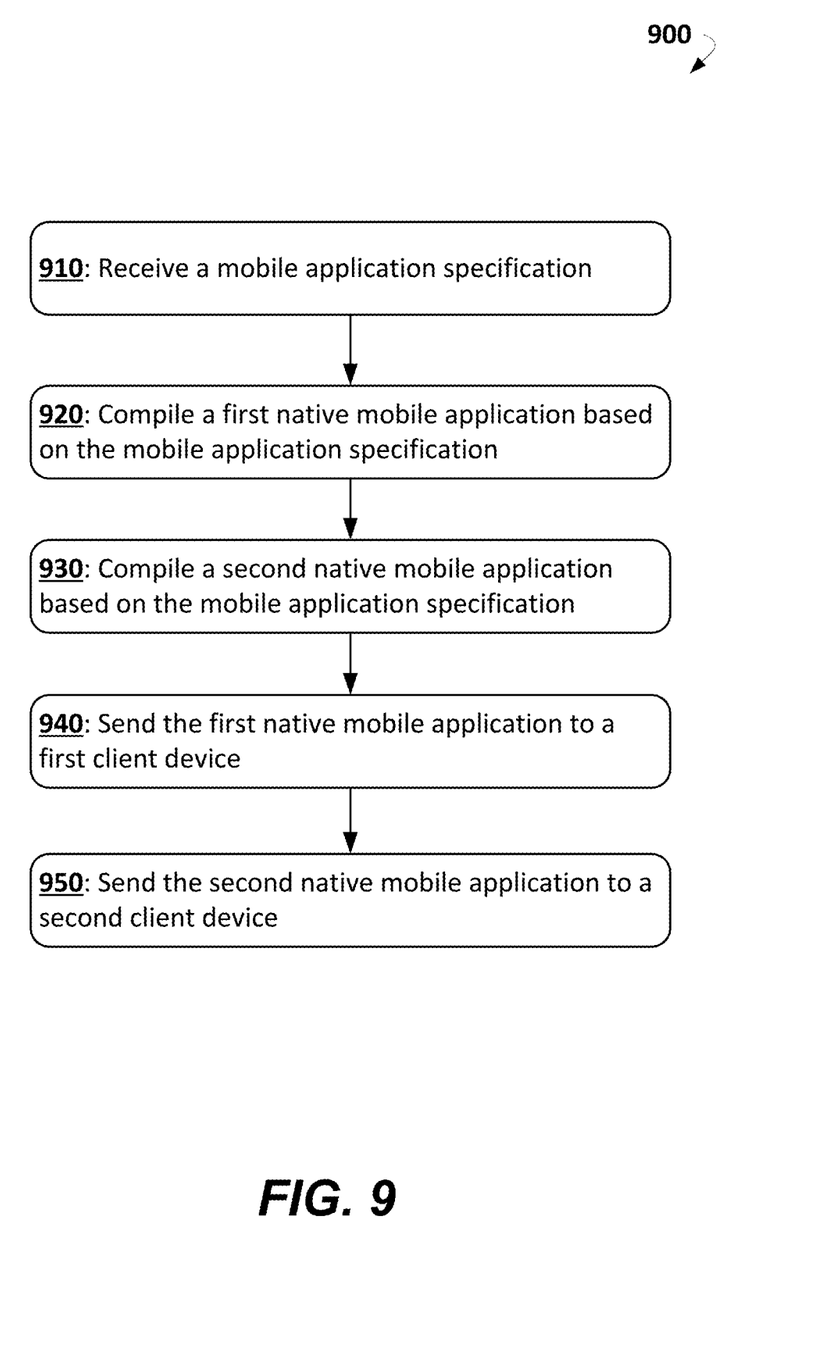
FIG. 9 shows a process flow diagram of yet another example method for creating and managing native mobile applications.

FIG. 9 shows a high-level process flow diagram of another method 900 for creating native mobile applications, according to one exemplary embodiment. The method 900 may be performed by processing logic that may comprise hardware (e.g., one or more processors, controllers, dedicated logic, programmable logic, and microcode), software (such as software run on a general-purpose computer system or a dedicated machine, firmware), or a combination of both. In some example embodiments, the method 900 is implemented by the platform 110 shown in FIGS. 1-3; however, it should be appreciated that the method 900 is just one example operation of the platform 110. In addition, the below recited steps of the method 900 may be implemented in an order different than described and shown in FIG. 9. Moreover, the method 900 may have additional steps not shown herein, but which can be evident for those skilled in the art from the present disclosure. The method 900 may also have fewer steps than outlined below and shown in FIG. 9.

The method 900 commences at step 910 with the mobile application engine 220 of the platform 110 receiving a mobile application specification as created by an enterprise user using the mobile application builder 210. At step 920, the mobile application engine 220 compiles or constructs a first native mobile application based on the mobile application specification. Similarly, at step 930, the mobile application engine 220 compiles or constructs a second native mobile application based on the same mobile application specification. Notably, the mobile application engine 220 can compile as many native mobile applications specific to certain hardware/OS platforms as needed.

At step 940, the mobile application engine 220 or another module sends the first native mobile application to a first client device 120, and at step 950, the mobile application engine 220 or another module sends the second native mobile application to a second client device 120, which is different from the first client device 120 and has a different OS and/or hardware than the first client device 120. These operations may be repeated as often as needed, and notably, the GUI and functionalities of the first and second native mobile applications substantially coincide with each other. In other words, every mobile application created by the mobile application engine 220 based on one mobile application specification provides a unified GUI and substantially the same functionalities regardless of the hardware or OS platform of the client devices 120.

Thus, systems and methods for creating and managing native mobile applications have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer system for creating and managing one or more native mobile applications, the system comprising a server being in communication with selected client devices, the server comprising one or more processors and a memory, the system further comprising:
   a mobile application builder comprising executable instructions for designing a mobile application using at least one web-console user interface, the mobile application builder being operable to create, maintain, and edit a mobile application specification associated with the mobile application, the mobile application specification including application applets which modularize activities of a workflow of the one or more native mobile applications;
   a mobile application engine comprising executable instructions for compiling one or more native mobile applications based at least on the mobile application specification, wherein each of the one or more native mobile applications is client device platform dependent; and
   a mobile application manager comprising executable instructions for delivering and deploying the one or more native mobile applications to the selected client devices and managing elements associated with the one or more native mobile applications and the mobile application specification, the elements including the workflow, lifecycle, usage, and content of the one or more native mobile applications.

2. The system of claim 1, wherein the mobile application builder is further configured to enable enterprise users to select, specify and configure user interface elements of the mobile application.

3. The system of claim 1, wherein the mobile application builder is further configured to enable enterprise users to select, specify and configure content of the mobile application.

4. The system of claim 1, wherein the mobile application builder is further configured to enable enterprise users to specify functionality and operation of the mobile application.

5. The system of claim 1, wherein the mobile application builder is further configured to enable enterprise users to select, integrate, configure and specify backend plug-in or widget elements of the mobile application.

6. The system of claim 1, wherein the mobile application builder is further configured to enable enterprise users to select, specify and configure an authentication mechanism or an authorization mechanism of the one or more native mobile applications.

7. The system of claim 1, wherein the mobile application builder is further configured to enable enterprise users to specify interaction of the one or more native mobile applications with backend and cloud services.

8. The system of claim 1, wherein the mobile application manager is further configured to manage a lifecycle of the one or more native mobile applications.

9. The system of claim 1, wherein the mobile application manager is further configured to track usage of the one or more native mobile applications.

10. The system of claim 1, wherein the mobile application manager is further configured to update the one or more native mobile applications based upon amendments to the mobile application specification such that the updated one or more native mobile applications are automatically generated from the mobile application specification, once the mobile application specification is published.

11. The system of claim 1, wherein the mobile application manager is further configured to collect statistical data associated with usage of the one or more native mobile applications and display the statistical data in an aggregated manner.

12. A method for creating and managing one or more native mobile applications, the method comprising:
enabling enterprise users, by a computing device comprising one or more processors and a memory, to design a mobile application using at least one web-console user interface and create, maintain, and edit a mobile application specification of the mobile application, the mobile application specification including application applets which modularize activities of a workflow of the one or more native mobile applications;
compiling, by the computing device, one or more native mobile applications based at least on the mobile application specification;
delivering, by the computing device, the one or more native mobile applications to selected client devices; and
managing, by the computing device, elements associated with the one or more native mobile applications and the mobile application specification, the elements including the workflow, lifecycle, usage, and content of the one or more native mobile applications.

13. The method of claim 12, wherein the one or more native mobile applications are independent from an operating system of one or more selected client devices.

14. The method of claim 12, further comprising enabling the enterprise users, by the computing device, to select, specify and configure user interface elements of the mobile application.

15. The method of claim 12, further comprising enabling the enterprise users, by the computing device, to integrate one or more plug-ins or widgets into the mobile application specification.

16. The method of claim 12, further comprising enabling the enterprise users, by the computing device, to select, specify and configure content of the mobile application.

17. The method of claim 12, further comprising enabling the enterprise users, by the computing device, to select, specify and configure a lifecycle of the mobile application.

18. The method of claim 12, further comprising enabling the enterprise users, by the computing device, to manage a lifecycle of the mobile application.

19. The method of claim 12, further comprising tracking, by the computing device, usage of the one or more native mobile applications.

20. A non-transitory processor-readable medium having instructions stored thereon, which when executed by one or more processors, cause the one or more processors to implement a method for creating and managing one or more native mobile applications, the method comprising:
enabling enterprise users to design a mobile application using at least one web-console user interface, the mobile application being operable to create, maintain, and edit a mobile application specification, the mobile application specification including application applets which modularize activities of a workflow of the one or more native mobile applications;
compiling one or more native mobile applications based at least on the mobile application specification;
delivering the one or more native mobile applications to selected client devices; and
managing elements associated with the one or more native mobile applications and the mobile application specification, the elements including the workflow, lifecycle, usage, and content of the one or more native mobile applications.

* * * * *